Figure 1:
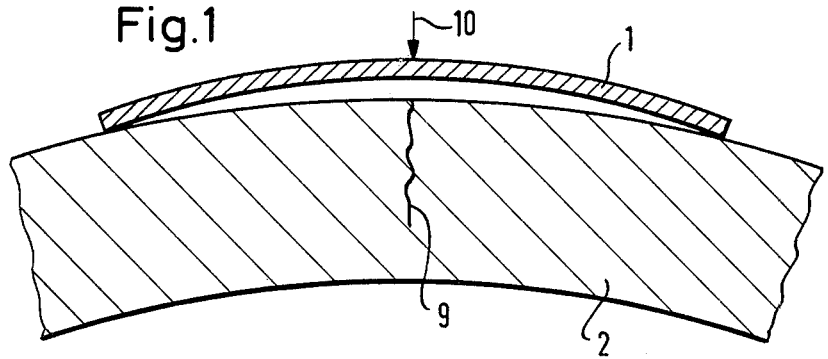

United States Patent [19]
Evertz et al.

[11] 3,955,265
[45] May 11, 1976

[54] METHOD OF APPLYING A PATCH TO A SURFACE
[75] Inventors: Egon Evertz; Rolf Seybold; Heinz Willi Stracke, all of Solingen, Germany
[73] Assignee: Egon Evertz, Solingen, Germany
[22] Filed: Mar. 24, 1975
[21] Appl. No.: 561,313

[30] Foreign Application Priority Data
Apr. 10, 1974 Germany............................ 2417428

[52] U.S. Cl.................................... 29/402; 29/446; 52/758 D; 249/204
[51] Int. Cl.²...................... B22D 19/10; B23P 7/04
[58] Field of Search................... 29/401.6, 402, 446; 249/204; 52/758 D

[56] References Cited
UNITED STATES PATENTS

| | | | |
|---|---|---|---|
| 1,592,609 | 7/1926 | Mattice | 29/402 X |
| 1,612,635 | 12/1926 | Hart | 29/446 X |
| 2,631,359 | 3/1953 | Schwartz | 29/446 |
| 2,842,074 | 7/1958 | Hess et al. | 29/446 UX |
| 3,236,407 | 2/1966 | Zelman et al. | 29/401.6 UX |
| 3,360,845 | 1/1968 | Buschmann | 29/401.6 |
| 3,470,048 | 9/1969 | Jones | 29/401.6 UX |
| 3,874,628 | 4/1975 | Jarron | 29/402 |

FOREIGN PATENTS OR APPLICATIONS

| | | | |
|---|---|---|---|
| 828,254 | 2/1960 | United Kingdom | 29/402 |
| 18,851 | 5/1971 | Japan | 29/402 |

*Primary Examiner*—Charlie T. Moon
*Attorney, Agent, or Firm*—Finnegan, Henderson, Farabow & Garrett

[57] ABSTRACT

A method of securing a patch of resilient material to a surface, in which method the patch is applied to the surface so as to form a curved clearance between itself and the surface, pressure is applied to press the central region of the patch against the surface, and the edges of the patch are subsequently secured to the surface. Also provided is an apparatus for carrying out the method, which apparatus includes a fluid pressure ram and means for supporting this in relation to the surface to enable the pressure to be applied to the patch. Means are provided for securing the terminal portions of the patch to the surface during application of pressure by the ram.

3 Claims, 3 Drawing Figures

METHOD OF APPLYING A PATCH TO A SURFACE

This invention concerns a method and apparatus for applying strips and sheets of elastic materials, in particular of steel, to planar surfaces, and in particular to the walls of steelworks ingot moulds to be repaired.

It is frequently necessary for various reasons to secure strips and sheets, or plates to surfaces. In the case, specifically envisaged by the present invention, of applying strips and sheets to the walls of steelworks ingot moulds for repair purposes such strips or sheets are used to cover cracks in said mould walls, the strips or sheets being secured in the material of the wall on both sides of the cracks thereby preventing an initial crack widening into an open split. In such cases appropriately tailored blanks are prepared from the strip or sheet material and initially held loosely against the damaged wall face until fixation is possible by fitting a connecting means at least at two points. This operation can only be performed by two people since it is impossible for a single person to hold and at the same time secure the blank, or patch. Another difficulty resides in that the patch can be closely applied to marry with the wall surface only by a considerable effort involving forging or similar work. On the other hand, such close-fitting engagement with the wall is essential if subsequent operational strains and stresses are to be largely borne by the fitted patch.

An object of the invention is to provide a method of applying a strip or sheet to a planar surface, and apparatus for carrying out this method which make it possible to economise in labour during the fitting of the strips or sheets whilst facilitating the fitting operation itself.

According to the invention, there is provided a method of applying a strip or sheet to a planar surface wherein the strip or sheet is applied to the surface in such a manner that a curved gap is formed between the strip or sheet and the surface to which it is applied, said gap being defined and limited by contact engagement of the edges of the strip or sheet with the surface, the strip or sheet being then pressed in its middle region against said surface until contact engagement occurs in said region, the terminal portions being subsequently firmly connected or bonded to the surface.

The application of pressure in the middle region for engagement with the surface to be treated may be discontinued after the terminal portions have been secured. The terminal portions may be brought into contact engagement with the treated surface and at the same time connected or bonded thereto in a particularly effective manner by means of screws engaging in the wall.

For the method according to this invention it is essential that the strip or sheet metal patch to be fitted has sufficient elasticity to allow a state of tension to be produced therein by the application under pressure which results in closely fitting contact engagement. While the middle region of the patch is thus applied under pressure to the surface to be treated the terminal or end regions of the patch may even stand off, away from the surface in the event of the latter being radiussed. At all events, it is however always ensured that, when the terminal portions have been finally secured, the strip or sheet metal patch will engage with the treated surface with a degree of tension which would not be obtained without the elastic deformation of the patch occurring as a result of this invention. As a result of this tension there is assured excellent mutual engagement between the patch and surface.

As a result of the application under pressure of the strip or sheet in the middle region of the patch against the wall surface there is in each case produced a corresponding pressure acting on the marginal edges of the patch which touch the treated surface and this pressure may be selected sufficiently strong to preclude all risk of the patch slipping or shifting from its predetermined correct position. In other words, the strip or sheet will retain its position after having been thus applied under pressure so that the end portions may then be finally secured in succession. Since no holding or retaining effort is any longer required during the fixing of the ends of the patching strip or sheet to the treated wall surface, this work may now be performed by a single operator.

From another aspect of the invention, apparatus for carrying out the above method as applied to ingot moulds and the like, comprises a yoke device provided with counter supports for embracing the wall and acting as a supporting means for a press ram which is position-adjustable towards the middle region of the patching strip or sheet. The yoke may conveniently be a rail or bar whereon the press ram is slidable in a direction perpendicular relative to the direction of pressing. The counter supports may also be adjustable to allow adaptation to different wall lengths. In either case such a device may be positioned, aligned and operated by a single person in as much as the patching strip or sheet is merely inserted between the ram and the ingot mould wall surface and then the ram is actuated. Provided the force of the engagement pressure is sufficiently strong the patching strip or sheet will remain in its correct position and can subsequently be fastened down.

In a modification of the yoke device it is also possible to use a device designed in the manner of a puller or extractor tool which is adapted to engage with a bolt to be introduced or driven into the wall and to be supported or braced from the exterior surface of the patching strip or sheet. In that event a hole is drilled into the strip or sheet so that the bolt may be engaged from the exterior by the retaining member of the puller tool.

In all cases hydraulic cylinders are advantageously employed for applying the engagement pressure forces.

Figure 2:
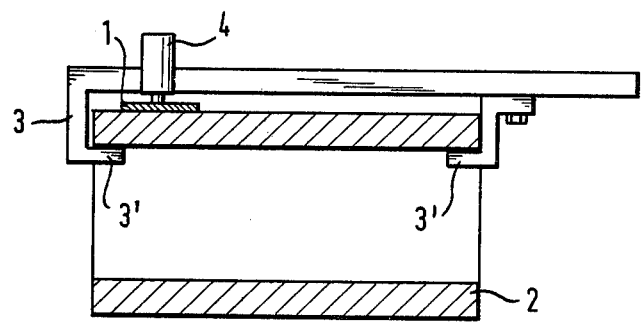
Figure 3:
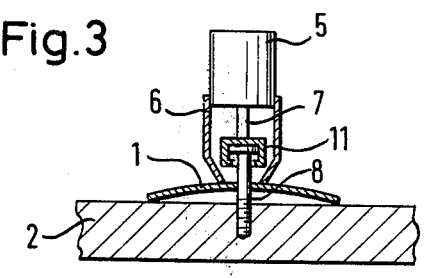

The invention will now be described, by way of example, with reference to the accompanying drawings in which:

FIG. 1 is a diagrammatic representation of one form of application of the method of this invention, FIG. 2 shows a first embodiment of apparatus for executing the method of the invention, and FIG. 3 shows a further embodiment of the apparatus for carrying out the method of the invention.

FIG. 1 shows the curved or radiussed wall 2 of an ingot mould which has a longitudinal crack 9. In the region of the exterior mould surface a tailored sheet metal patch 1 has been placed over the curved wall surface, the radius of curvature of said patch being less than that of the mould wall 2. In this way a hollow gap or space is formed between the patching piece 1 and the wall face 2, said gap being delimited by the edges of the patching piece 1 touching the mould wall.

The engagement pressure force 10 acts approximately in the middle region of the patching piece 1 and when this force has reached its full value it retains the piece 1 firmly applied to the wall surface without any intervening clearance or gap. In this latter condition the terminal portions of the patching piece 1 are secured to the wall 2 in the manner described.

Whilst in the foregoing example of execution a radiussed wall surface and a patching piece curved to a smaller radius have been shown, it will be appreciated that in principle the wall face to which the radiussed patching piece 1 is applied may be flat. In the event of an internally radiussed or concave wall being provided with a strip or sheet metal patching piece the latter may also be perfectly plane, or possess a lesser curvature than that of the wall surface. In either case this will produce the crucial gap or clearance which is curved or radiussed at least on one side thereof and defined by the work-touching outer marginal edges of the patching piece.

The apparatus of FIG. 2 comprises a yoke 3 made from a rail section on which the cylinder 4 is slidable. Preferably one of the two counter supports 3 provided is also slidable on the rail to allow adaptation to different wall lengths. The patching piece 1 is placed with its middle portion beneath the extended piston rod of the cylinder 4 and applied by said piston rod against the exterior wall face 2 under the required engagement pressure to allow the necessary fastenings or securings to be made.

By contrast with FIG. 2, wherein the patching piece 1 is illustrated applied under ram pressure, FIG. 3 illustrates in a modified apparatus the position of the patching piece 1 prior to pressure application. An aperture was first prepared approximately in the middle of the piece 1 through which was inserted the bolt which is adapted to be screwed into the wall 2. The bolt head is surrounded and gripped by the clamp 11 of a puller or extractor tool which is supported by a thrust ring 6 on the patching piece 1. The clamp 11 is at the end of a piston rod 7 which extends outwardly from a cylinder 5 chargeable by a pressure medium. When the cylinder 5 is charged the piston rod 7 is retracted into the cylinder so that the patching piece 1 is then pressed firmly and smoothly by means of the thrust ring 6 against the exterior face of the wall 2. The domed shape of the piece 1 still recogniseable in FIG. 3 will then disappear completely.

We claim:

1. A method of applying a patch of an elastic metal material to a surface, and in particular to a wall of a steelwork ingot mould to be repaired, the method comprising placing a piece of said material on said surface in such a manner that a curved clearance is formed between the material and the surface, the clearance being defined and limited by the contact engagement of the marginal edges of the piece of material with the surface, subjecting the piece of material so placed in its middle region to a pressure at least sufficient to elastically deform this region into face contact with the surface, and subsequently firmly securing the terminal portions of the piece of material to said surface.

2. A method according to claim 1, wherein the application under pressure of the middle region against the surface is discontinued after securing of the terminal portions.

3. A method according to claim 1 wherein the terminal portions are brought into engagement with the surface and connected thereto by means of screw bolts passed through the surface.

* * * * *